(12) United States Patent
Brown et al.

(10) Patent No.: US 8,532,390 B2
(45) Date of Patent: Sep. 10, 2013

(54) SEMANTIC PARSING OF OBJECTS IN VIDEO

(75) Inventors: Lisa Marie Brown, Pleasantville, NY (US); Rogerio Schmidt Feris, White Plains, NY (US); Arun Hampapur, Norwalk, CT (US); Daniel André Vaquero, Santa Barbara, CA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 12/845,095

(22) Filed: Jul. 28, 2010

(65) Prior Publication Data
US 2012/0027304 A1  Feb. 2, 2012

(51) Int. Cl.
*G06K 9/00* (2006.01)

(52) U.S. Cl.
USPC .......................................................... 382/190

(58) Field of Classification Search
None
See application file for complete search history.

(56) References Cited

U.S. PATENT DOCUMENTS

| | | |
|---|---|---|
| 5,870,138 A | 2/1999 | Smith et al. |
| 6,549,913 B1 | 4/2003 | Murakawa |
| 6,608,930 B1 | 8/2003 | Agnihotri et al. |
| 6,795,567 B1 | 9/2004 | Cham et al. |
| 6,885,761 B2 | 4/2005 | Kage |
| 6,920,236 B2 | 7/2005 | Prokoski |
| 6,967,674 B1 | 11/2005 | Lausch |
| 7,006,950 B1 | 2/2006 | Greiffenhagen et al. |
| 7,257,569 B2 | 8/2007 | Elder et al. |
| 7,274,803 B1 | 9/2007 | Sharma et al. |
| 7,277,891 B2 | 10/2007 | Howard et al. |
| 7,355,627 B2 | 4/2008 | Yamazaki et al. |

(Continued)

FOREIGN PATENT DOCUMENTS

| | | |
|---|---|---|
| DE | 19960372 A1 | 6/2001 |
| FR | 2875629 A1 | 3/2006 |

(Continued)

OTHER PUBLICATIONS

Ronfard et al "Learning to parse pictures of people" Jan. 1, 2002.*

(Continued)

*Primary Examiner* — Nancy Bitar

(57) ABSTRACT

The invention provides an improved method to detect semantic attributes of human body in computer vision. In detecting semantic attributes of human body in computer vision, the invention maintains a list of semantic attributes, each of which corresponds to a human body part. A computer module then analyzes segments of a frame of a digital video to detect each semantic attribute by finding a most likely attribute for each segment. A threshold is applied to select candidate segments of the frame for further analysis. The candidate segments of the frame then go through geometric and resolution context analysis by applying the physical structure principles of a human body and by analyzing increasingly higher resolution versions of the image to verify the existence and accuracy of parts and attributes. A computer module computes a resolution context score for a lower resolution version of the image based on a weighted average score computed for a higher resolution version of the image by evaluating appearance features, geometric features, and resolution context features when available on the higher resolution version of the image. Finally, an optimal configuration step is performed via dynamic programming to select an optimal output with both semantic attributes and spatial positions of human body parts on the frame.

24 Claims, 14 Drawing Sheets

(56) References Cited

U.S. PATENT DOCUMENTS

| | | | |
|---|---|---|---|
| 7,382,894 B2 | 6/2008 | Ikeda et al. | |
| 7,391,900 B2 | 6/2008 | Kim et al. | |
| 7,395,316 B2 | 7/2008 | Ostertag et al. | |
| 7,406,184 B2 | 7/2008 | Wolff et al. | |
| 7,450,735 B1 | 11/2008 | Shah et al. | |
| 7,460,149 B1 | 12/2008 | Donovan et al. | |
| 7,526,102 B2 | 4/2009 | Ozer | |
| 7,822,227 B2* | 10/2010 | Barnes et al. | 382/103 |
| 7,974,714 B2* | 7/2011 | Hoffberg | 700/94 |
| 8,004,394 B2* | 8/2011 | Englander | 340/433 |
| 8,208,694 B2* | 6/2012 | Jelonek et al. | 382/118 |
| 8,411,908 B2* | 4/2013 | Ebata et al. | 382/115 |
| 2003/0120656 A1 | 6/2003 | Kageyama et al. | |
| 2005/0013482 A1 | 1/2005 | Niesen | |
| 2005/0162515 A1 | 7/2005 | Venetianer et al. | |
| 2006/0165386 A1 | 7/2006 | Garoutte | |
| 2006/0184553 A1 | 8/2006 | Liu et al. | |
| 2006/0285723 A1 | 12/2006 | Morellas et al. | |
| 2007/0052858 A1 | 3/2007 | Zhou et al. | |
| 2007/0053513 A1* | 3/2007 | Hoffberg | 380/201 |
| 2007/0122005 A1 | 5/2007 | Kage et al. | |
| 2007/0126868 A1 | 6/2007 | Kiyohara et al. | |
| 2007/0177819 A1 | 8/2007 | Ma et al. | |
| 2007/0183763 A1 | 8/2007 | Barnes et al. | |
| 2007/0237355 A1 | 10/2007 | Song et al. | |
| 2007/0237357 A1 | 10/2007 | Low | |
| 2007/0294207 A1* | 12/2007 | Brown et al. | 707/1 |
| 2008/0002892 A1 | 1/2008 | Jelonek et al. | |
| 2008/0080743 A1 | 4/2008 | Schneiderman et al. | |
| 2008/0122597 A1* | 5/2008 | Englander | 340/433 |
| 2008/0123968 A1 | 5/2008 | Nevatia et al. | |
| 2008/0159352 A1* | 7/2008 | Adhikari et al. | 374/4 |
| 2008/0201282 A1 | 8/2008 | Garcia et al. | |
| 2008/0211915 A1 | 9/2008 | McCubbrey | |
| 2008/0218603 A1 | 9/2008 | Oishi | |
| 2008/0232651 A1 | 9/2008 | Woo | |
| 2008/0252722 A1 | 10/2008 | Wang et al. | |
| 2008/0252727 A1 | 10/2008 | Brown et al. | |
| 2008/0269958 A1 | 10/2008 | Filev et al. | |
| 2008/0273088 A1 | 11/2008 | Shu et al. | |
| 2008/0317298 A1 | 12/2008 | Shah et al. | |
| 2009/0046153 A1 | 2/2009 | Chen et al. | |
| 2009/0060294 A1 | 3/2009 | Matsubara et al. | |
| 2009/0066790 A1 | 3/2009 | Hammadou | |
| 2009/0074261 A1 | 3/2009 | Haupt et al. | |
| 2009/0097739 A1 | 4/2009 | Rao et al. | |
| 2009/0174526 A1 | 7/2009 | Howard et al. | |
| 2009/0261979 A1 | 10/2009 | Breed et al. | |
| 2009/0295919 A1 | 12/2009 | Chen et al. | |
| 2010/0106707 A1 | 4/2010 | Brown et al. | |
| 2010/0150447 A1 | 6/2010 | GunasekaranBabu et al. | |
| 2011/0087677 A1 | 4/2011 | Yoshio et al. | |
| 2012/0039506 A1* | 2/2012 | Sturzel et al. | 382/103 |

FOREIGN PATENT DOCUMENTS

| | | |
|---|---|---|
| JP | 2004070514 A2 | 3/2004 |
| WO | 2009117607 A1 | 9/2009 |
| WO | 2009133667 A1 | 11/2009 |
| WO | 2010023213 A1 | 3/2010 |

OTHER PUBLICATIONS

Mohan et al., Example-Based Object Detection in Images by Components, IEEE Transactions on Pattern Analysis and Machine Intelligence, vol. 23, No. 4, Apr. 2001, pp. 349-361.

International Search Report for PCT/EP2011/062910 dated Oct. 6, 2011.

Mittal, Anurag et al, "M2Tracker: A Multi-View Approach to Segmenting and Tracking People in a Cluttered Scene", International Journal of Computer Vision, vol. 51, Issue 3, pp. 189-203, Feb. 2003.

KAEWaewTrakulPong, Pakorn et al, "A Real Time Adaptive Visual Surveillance System for Tracking Low-Resolution Colour Targets in Dynamically Changing Scenes", Image and Vision Computing, vol. 21, Issue 1-0, pp. 913-929, 2003.

Park, Sangho, et al, "Simultaneous Tracking of Multiple Body Parts of Interacting Persons", Computer Vision and Image Understanding, vol. 102, Issue 1, pp. 1-21, 2006.

Schmidt, Joachim, "Automatic Initialization for Body Tracking—Using Appearance to Learn a Model for Tracking Human Upper Body Motions", 3rd International Conference on Computer Vision Theory and Applications (VISAPP), Jan. 22, 2008.

Chibelushi, Claude et al, "Facial Expression Recognition: A Brief Tutorial Overview", pp. 1-5, 2002.

Feris, Rogerio Schmidt, et al, "Detection and Tracking of Facial Features in Video Sequences", Lecture Notes in Computer Science, vol. 1793, Proceedings of the Mexican International Conference on Artificial Intelligence: Advances in Artificial Intelligence, pp. 129-137, Publisher Springer-Verlag, 2000.

Xu, Y.W., et al, "Pedestrian Detection with Local Feature Assistant", Control and Automation, 2007, ICCA 2007, IEEE International Conference on May 30-Jun. 1, 2007, pp. 1542-1547, 2007.

Mohan, Anuj et al, "Example-Based Object Detection in Images by Components", IEEE Transactions on Pattern Analysis and Machine Intelligence, vol. 23, No. 4, pp. 349-361, Apr. 2001.

Felzenszwalb, et al, "Pictorial Structures for Object Recognition", International Journal of Computer Vision (IJCV), pp. 1-42, Jan. 2005.

Viola, et al, "Robust Real-time Object Detection", Cambridge Research Laboratory Technical Report Series, pp. 1-24, Feb. 2001.

Wu, Bo et al, "Fast Rotation Invariant Multi-View Face Detection Based on Real Adaboost", IEEE International Conference on Automatic Face and Gesture Recognition (FGR'04), 2004.

Ramanan et al, "Strike a Pose: Tracking People by Finding Stylized Poses," Computer Vision and Pattern Recognition (CVPR), San Diego, CA, Jun. 2005.

Tran et al, "Configuration Estimates Improve Pedestrian Finding," National Information Processing Systems Foundation, 2007.

N. Dalal et al, "Histograms of Oriented Gradients for Human Detection," IEEE Conference on Computer Vision and Pattern Recognition, San Diego, USA, Jun. 2005, vol. II, pp. 886-893, 2005.

Tsochantaridis et al, "Large Margin Methods for Structured and Interdependent Output Variables," Journal of Machine Learning Research (JMLR), Sep. 2005.

Naive Bayes Classifier, Wikipedia, http://en.wikipedia.orglwiki/Naive_Bayes_classifier, Jul. 27, 2010, 7 pages.

Bi, Sheng, et al, "Human Body Segmentation Based on Adaptive Feature Selection in Complex Situations", Society for Imaging Science and Technology, United Sates; Society of Photo-optical Instrumentation Engineers, United States Image Conference (San Jose, CA, USA) 2008 Journal: Proceedings of SPIE—The International Society for Optical Engineering, 2008.

Lao, Weilun et al, "Fast Detection and Modeling of Human-Body Parts from Monocular Video", Springer-Verlag Berlin Heidelberg 2008, pp. 380-389, 2008.

Jiang et al., "View Synthesis from Infrared-visual Fused 3D Model for Face Recognition", Fifth Intl. Conference on Information, Communications and Signal Processing, pp. 177-180, 2005.

Gundimada et al., "Feature Selection for Improved Face Recognition in Multisensor Images", In R. Hammoud, B. Abidi and M. Abidi, editors, Face Biometrics for Personal Identification, Signals and Communication Technology, pp. 109-120, Springer Berlin Heidelberg, 2007.

Tian et al., "Real-time Detection of Abandoned and Removed Objects in Complex Environments", IBM TJ Watson Research Center, 8 pages.

Viola et al., "Rapid Object Detection using a Boosted Cascade of Simple Features", IEEE, ISBN 0-7695-1272-0/01, 8 pages, 2001.

Conaire et al., "Multispectral Object Segmentation and Retrieval in Surveillance Video", Centre for Digital Video Processing, Dublin City University, Ireland, 2006 IEEE, pp. 2381-2384, 2006.

Tseng et al., "Mining from Time Series Human Movement Data", 2006 IEEE International Conference on Systems, Man, and Cybernetics, Oct. 8-11, 2006 Taipei, Taiwan, pp. 3241-3243, 2006.

Raskar et al., "Image Fusion for Context Enhancement and Video Surrealism", Association for Computing Machinery, Inc., 2004, pp. 85-93, and 153, 2004.

Abidi et al., "Survey and Analysis of Multimodal Sensor Planning and Integration for Wide Area Surveillance", ACM Computing Surveys, vol. 41, No. 1, Article 7, publication date 2006, pp. 7:2-7:36, 2006.

Kong et al., "Recent Advances in Visual and Infrared Face Recognition—a Review", Computer Vision and Understanding 97 (2005), 2004 Elsevier, Inc., pp. 103-134, 2004.

Boyle et al., "The Language of Privacy: Learning from Video Media Space Analysis and Design", ACM Transactions on Computer-Human Interactions, vol. 12, No. 2, Jun. 2005, pp. 328-370, 2005.

Milian, Carmelo, "Virtual Interviews", IPCOM000170611D, May 22, 2008, 3 pages, 2008.

Fukuda et al., "Visual Surveillance System with Multiple Cameras in Wide Area Environment", Nihon Kikai Gakkai Ronbunshu C (Transactions of the Japan Society of Mechanical Engineers, pt. C), vol. 69, Issue 680, Apr. 2003, pp. 1011-1018, English Abstract Only, 2003.

Petrushin et al., "Multiple Sensor Integration for Indoor Surveillance", MDM/KDD 2005, Aug. 21, 2005, Chicago, Illinois, USA, pp. 53-60, 2005.

Trease et al.,"Unstructured Data Analysis of Streaming Video Using Parallel, High-throughput Algorithms", Proceedings of the Ninth lasted International Conference on Signal and Image Processing, Aug. 20-22, 2007, Honolulu, Hawaii, USA, pp. 305-310, 2007.

Hampapur et al., "Smart Video Surveillance Exploring the Concept of Multiscale Spatiotemporal Tracking", IEEE Signal Processing Magazine, Mar. 2005, pp. 38-51, 2005.

Kang et al., "Continuous Tracking within and Across Camera Streams", Proceedings of the 2003 IEEE Computer Society Conference on Computer Vision and Pattern Recognition (CVPR'03), 6 pages, 2003.

Comaniciu et al., "Real-Time Tracking of Non-Rigid Objects Using Mean Shift", IEEE CVPR 2000, pp. 1-8, 2000.

U.S. Appl. No. 12/845,121, "Multispectral Detection of Personal Attributes for Video Surveillance", filed Jul. 28, 2010.

U.S. Appl. No. 12/845,119, "Attribute-Based Person Tracking Across Multiple Cameras", filed Jul. 28, 2010.

U.S. Appl. No. 12/845,116, "Facilitating People Search in Video Surveillance", filed Jul. 28, 2010.

Ronfard et al., Learning to Parse Pictures of People, Lecture Notes in Computer Science—LNCS, vol. 2353, Jan. 1, 2002, pp. 700-714.

Li-Jia Li et al., Towards Total Scene Understanding: Classification, Annotation and Segmentation in an Automatic Framework, Computer Vision and Pattern Recognition, 2009, CVPR 2009. IEEE, Piscataway, NJ, USA, Jun. 20, 2009, pp. 2036-2043.

Szelisky, Computer Vision: Algorithms and Applications, Jan. 1, 2011, Springer, pp. 615-621.

Marr, Vision, Jan. 1, 1982, Freeman, pp. 305-313.

Ramanan, Part-Based Models for Finding People and Estimating Their Pose, in: Thomas B. Moeslund et al., Visual Analysis of Humans, Jan. 1, 2011, Springer, pp. 1-25.

Zhu et al., A Stochastic Grammar of Images, Jan. 1, 2007, Now Publishers, pp. 259-362.

Vaquero et al., Chapter 14: Attribute-Based People Search, in: Yunqian Ma et al. Intelligent Video Surveillance: Systems and Technology, Jan. 1, 2009, pp. 387-405.

Feris, Chapter 3, Case Study: IBM Smart Surveillance System, in: Yunqian Ma et al., Intelligent Video Surveillance: System and Technology, Jan. 1, 2009, pp. 47-76.

Nowozin et al., Structured Learning and Prediction in Computer Vision, Jan. 1, 2011, Now Publishers, pp. 183-365.

Wu, Integration and Goal-Guided Scheduling of Bottom-up and Top-Down Computing Processes in Hierarchical Models, UCLA Jan. 1, 2011.

Lin L et al., A Stochastic Graph Grammar for Compositional Object Representation and Recognition, Pattern Recognition, Elsevier, GB, vol. 42, No. 7, Jul. 1, 2009, pp. 1297-1307.

Yang et al., Evaluating Information Contributions of Bottom-up and Top-down Processes, Computer Vision, 2009 IEEE, Piscataway, NJ, USA, Sep. 29, 2009, pp. 1042-1049.

Tan et al., Enhanced Pictorial Structures for Precise Eye Localization Under Incontrolled Conditions, Computer Vision and Pattern Recognition, 2009. CVPR 2009. IEEE, Piscataway, NJ, USA Jun. 20, 2009, pp. 1621-1628.

Ioffe et al., Probabilistic Methods for Finding People, International Journal of Computer Vision, Kluwer Academic Publishers, Norwell, US, vol. 43, No. 1, Jun. 1, 2001, pp. 45-68.

Samangooei et al., The Use of Semantic Human Description as a Soft Biometric, Biometrics: Theory, Applications and Systems, 2008. BTAS 2008. 2nd IEEE International Conference.

Park et al., Multiresolution Models for Object Detection, in Proceedings of the 11th European Conference on Computer Vision: Part IV, pp. 241-254 (2010).

* cited by examiner

| SEMANTIC ATTRIBUTE | CORRESPONDING BODY PART |
|---|---|
| BEARD | LOWER FACE REGION |
| MOUSTACHE | LOWER FACE REGION |
| EYEGLASSES | MIDDLE FACE REGION |
| BALDNESS | UPPER FACE REGION |
| WEARING A HAT | UPPER FACE REGION |
| WEARING A SKIRT | LEGS |

FIG. 5

SEMANTIC PARSING OF OBJECTS IN VIDEO

CROSS-REFERENCE TO RELATED APPLICATIONS

The present application is related to U.S. patent application entitled "Multispectral Detection of Personal Attributes for Video Surveillance," identified by Ser. No. 12/845,121 and filed concurrently herewith, the disclosure of which is incorporated by reference herein in its entirety.

Additionally, the present application is related to U.S. patent application entitled "Facilitating People Search in Video Surveillance," identified by Ser. No. 12/845,116, and filed concurrently herewith, the disclosure of which is incorporated by reference herein in its entirety.

Also, the present application is related to U.S. patent application entitled "Attribute-Based Person Tracking Across Multiple Cameras," identified by Ser. No. 12/845,119, and filed concurrently herewith, the disclosure of which is incorporated by reference herein in

FIELD OF THE INVENTION

The invention relates to video processing and object identification, and more particularly relates to analyzing images of objects to identify attributes.

BACKGROUND

Automatically identifying the locations of objects and their parts in video is important for many tasks. For example, in the case of human body parts, automatically identifying the locations of human body parts is important for tasks such as automated action recognition, human pose estimation, etc. Body parsing is a term used to describe the computerized localization of individual body parts in video. Current methods for body parsing in video estimate only part locations such as head, legs, arms, etc. See e.g., "Strike a Pose: Tracking People by Finding Stylized Poses," Ramanan et al., Computer Vision and Pattern Recognition (CVPR), San Diego, Calif., June 2005; and "Pictorial Structures for Object Recognition," Felzenszwalb et al., International Journal of Computer Vision (IJCV), January 2005.

Most previous methods in fact only perform syntactic object parsing, i.e., they only estimate the localization of object parts (e.g., arms, legs, face, etc.) without efficiently estimating semantic attributes associated with the object parts.

In view of the foregoing, there is a need for a method and system for effectively identifying semantic attributes of objects from images.

SUMMARY

The invention resides in a method, computer program product, computer system and process for estimating parts and attributes of an object in video. The method, computer program product, computer system and process comprising receiving a video input; detecting an object from the video input and cropping an image of the object from the video input; receiving a plurality of semantic attributes with associated parts for the object; producing and storing a plurality of versions of the image, each version having a different resolution of the image of the object; computing an appearance score at each region of a plurality of regions on the lowest resolution version of the versions of the image of the object for the plurality of semantic attributes, the appearance score for at least one semantic attribute of the plurality of semantic attributes for each region denoting a probability of each semantic attribute of the at least one semantic attribute appearing in the region; analyzing increasingly higher resolution versions than the lowest resolution version to compute a resolution context score for each region in the lowest resolution version, the resolution context score in the lowest resolution version being indicative of an extent to which finer spatial structure exists in the increasingly higher resolution versions than in the lowest resolution version for each region; ascertaining an optimized configuration of body parts and associated semantic attributes in the lowest resolution version, the ascertaining utilizing the appearance scores and the resolution context scores in the regions in the lowest resolution version; displaying and/or storing the optimized configuration of body parts and associated semantic attributes.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 5 shows examples of semantic attributes being associated with body parts according to an embodiment of the invention.

Figure 1:
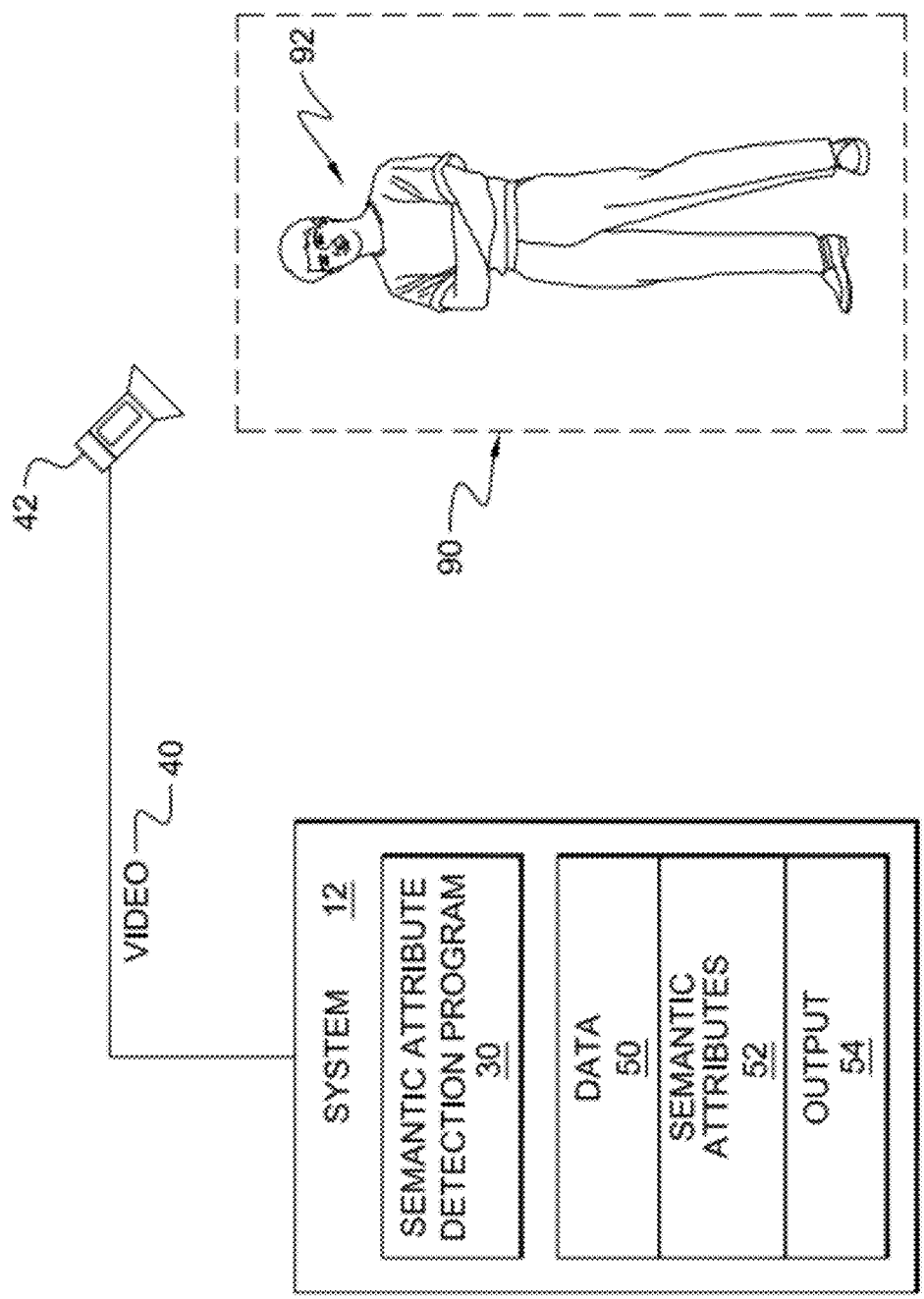
FIG. 1 shows an illustrative environment for a system for detecting semantic attributes of a human body according to an embodiment of the invention.

It is noted that the drawings are not to scale. The drawings are intended to depict only typical aspects of the invention, and therefore should not be considered as limiting the scope of the invention. While the drawings illustrate the processing of human bodies in video, the invention extends to the processing of other objects in video. In the drawings, like numbering represents like elements between the drawings.

DETAILED DESCRIPTION

The invention relates to video processing and object identification, and more particularly relates to analyzing images of objects to identify attributes.

Aspects of the invention provide an improved solution for detecting semantic attributes of objects in video. For example, aspects of the invention provide for the extraction of attributes from body parts to enable automatic searching of people in videos based on a personal description. In another example, the invention provides for the extraction of attributes from cars to enable automatic searching of cars in video based on a description of a car. A possible query could be: "show all people entering IBM last month with beard, wearing sunglasses, wearing a red jacket and blue pants" or "show all blue two-door Toyota with diamond hub caps entering the IBM parking lot last week."

The invention deals with the problem of semantic object parsing, where the goal is to effectively estimate both part locations and semantic attributes in the same process. Using human body parsing as an example, embodiments of the invention provide for the estimation of semantic attributes of human body parts together with the localization of body parts in the same process. Overcoming the inefficiency and inaccuracy of the previous approaches, the invention leverages a global optimization scheme to estimate both parts and their corresponding attributes simultaneously.

Unlike previous approaches, embodiments of the invention use semantic attributes such as "beard," "moustache," and "no facial hair" to not only locate the human body part but also identify the attribute of the body part. For example, instead of only identifying a body part such as a "leg," the invention uses semantic attributes such as "black trousers," "long skirts," and "shorts" to both locate the body part and identify its attributes. The invention maintains a data table relating each semantic attribute to a corresponding body part. For example, the semantic attribute "beard" corresponds to the body part "lower face region."

Embodiments of the invention are based on three kinds of features: appearance features, resolution context features, and geometric features. The appearance features refer to the scores obtained by comparing semantic attributes from an image library to what appears to be on the image to evaluate the probability of a match. The resolution context features refer to object consistency under different image resolutions. The resolution context score for a particular region is the weighted average score from the particular region's higher resolution image. A total score is computed for the higher resolution image by adding up the appearance scores, geometric scores and if, a higher resolution image is available, resolution context scores. The resolution context score is computed from a higher resolution image as the total score at a given region divided by the number of sub-regions which compose that region on the higher resolution image being analyzed. The geometric features refer to the scores computed based on the spatial relationships among the underlying parts in a probable configuration. For example, a potential attribute of "beard" corresponds to a "face" and a "black shirt" corresponds to a "torso." The geometric features test the accuracy of the candidate semantic attributes by applying the general human body configuration principle that a "face" is both above a "torso" and of a certain distance from a "torso."

In the example of human body parsing, aspects of the invention estimate not only human body part locations, but also their semantic attributes such as color, facial hair type, presence of glasses, etc. In other words, aspects of the invention utilize a unified learning scheme to perform both syntactic parsing, i.e., location estimation, and semantic parsing, i.e., extraction of semantic attributes that describe each body part. The invention detects both body parts and attributes in the same process to more accurately identify the attributes of a human body over the prior art.

Turning to the drawings, FIG. 1 shows an illustrative environment for detecting semantic attributes of a human body according to an embodiment of the invention. To this extent, at least one camera 42 captures a scene, or background 90. Often, the background, or scene 90 may include at least one object, such as person 92. A digital video input 40 is obtained and sent to a system 12 that includes, for example, a semantic attribute detection program 30, data 50, predetermined or specified semantic attributes 52, output 54 and/or the like, as discussed herein.

Figure 2:
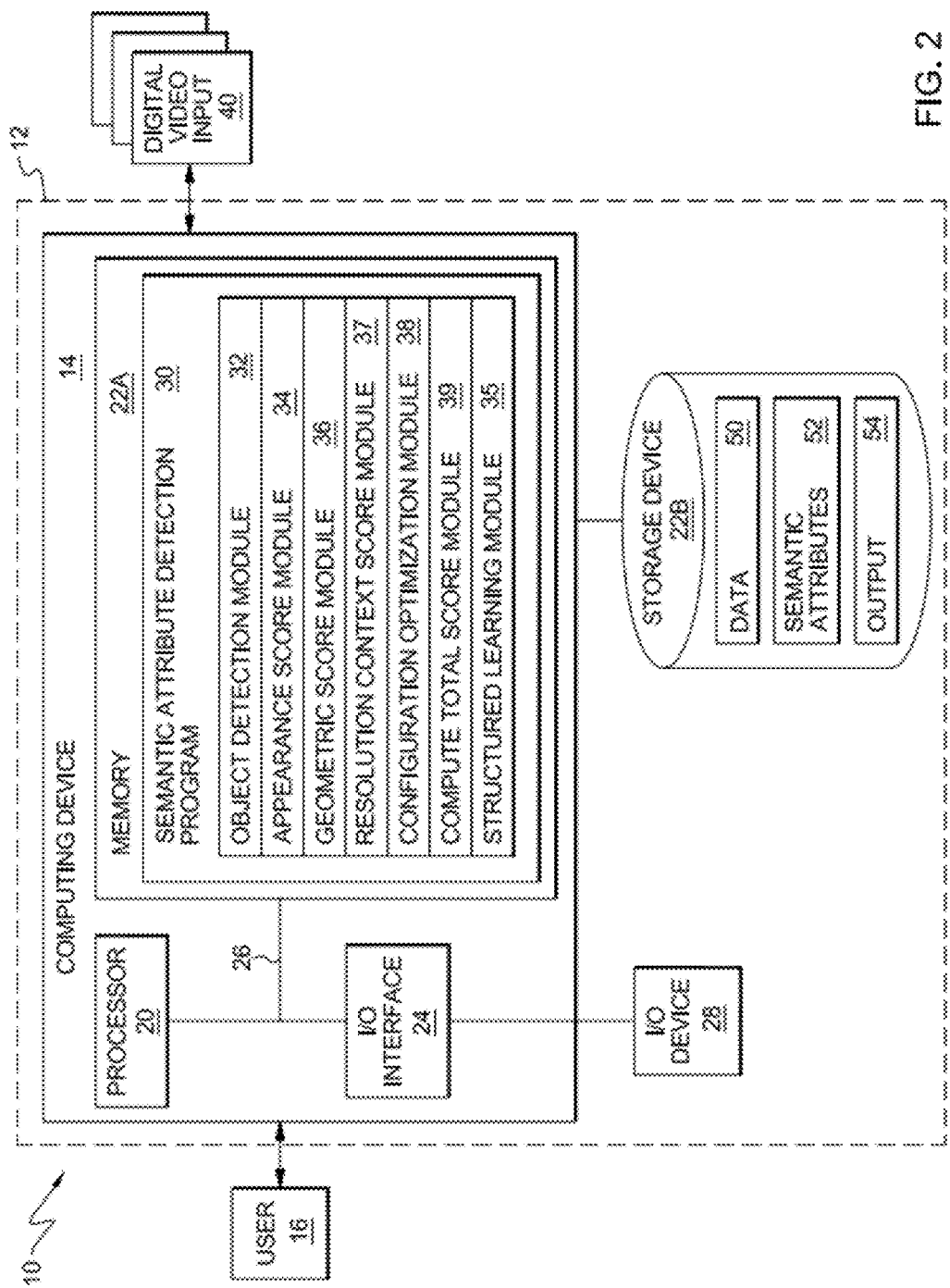
FIG. 2 shows a close up of an illustrative environment for detecting semantic attributes in human body in video according to an embodiment of the invention.

FIG. 2 shows a closer view of an illustrative environment 10 for detecting semantic attributes of person 92 (FIG. 1) in video 40 according to an embodiment of the invention. To this extent, environment 10 includes a computer system 12 that can perform the process described herein in order to detect semantic attributes of person 92 in video 40. In particular, computer system 12 is shown including a computing device 14 that comprises a semantic attribute detection program 30, which makes computing device 14 operable for detecting semantic attributes of person 92 (FIG. 1) in video 40, by performing the process described herein.

Computing device 14 is shown including a processor 20, a memory 22A, an input/output (I/O) interface 24, and a bus 26. Further, computing device 14 is shown in communication with an external I/O device/resource 28 and a non-transitory computer readable storage device 22B (e.g., a hard disk, a floppy disk, a magnetic tape, an optical storage such as a compact disc (CD) or a digital video disc (DVD)). In general, processor 20 executes program code, such as semantic attribute detection program 30, which is stored in a storage system, such as memory 22A (e.g., a dynamic random access memory (DRAM), a read-only memory (ROM), etc.) and/or storage device 22B. While executing program code, processor 20 can read and/or write data, such as data 36 to/from memory 22A, storage device 22B, and/or I/O interface 24. A computer program product comprises the storage device 22B on which the program code is stored for subsequent execution by the processor 20 to perform a method for estimating parts and attributes of an object in video. Bus 26 provides a communications link between each of the components in computing device 14. I/O device 28 can comprise any device that transfers information between a user 16 and computing device 14 and/or digital video input 40 and computing device 14. To this extent, I/O device 28 can comprise a user I/O device to enable an individual user 16 to interact with computing device 14 and/or a communications device to enable an element, such digital video input 40, to communicate with computing device 14 using any type of communications link. I/O device 28 represents at least one input device (e.g., keyboard, mouse, etc.) and at least one (e.g., a printer, a plotter, a computer screen, a magnetic tape, a removable hard disk, a floppy disk).

In any event, computing device 14 can comprise any general purpose computing article of manufacture capable of executing program code installed thereon. However, it is understood that computing device 14 and semantic attribute detection program 30 are only representative of various possible equivalent computing devices that may perform the process described herein. To this extent, in other embodiments, the functionality provided by computing device 14 and semantic attribute detection program 30 can be implemented by a computing article of manufacture that includes any combination of general and/or specific purpose hardware and/or program code. In each embodiment, the program code and hardware can be created using standard programming and engineering techniques, respectively. Such standard programming and engineering techniques may include an open architecture to allow integration of processing from different locations. Such an open architecture may include cloud computing. Thus the present invention discloses a process for supporting computer infrastructure, integrating, hosting, maintaining, and deploying computer-readable code into the computer system 12, wherein the code in combination with the computer system 12 is capable of performing a method for estimating parts and attributes of an object in video.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, semantic attribute detection program 30 enables computer system 12 to detect semantic attributes of objects, such as person 92 (FIG. 1) in video 40. To this extent, semantic attribute detection program 30 is shown including an object detection module 32, an appearance score module 34, a geometric score module 36, a resolution context module 37, a configuration optimization module 38, a compute total score module 39, and a structured learning module 35. Operation of each of these modules is discussed further herein. However, it is understood that some of the various modules shown in FIG. 2 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Figure 3:
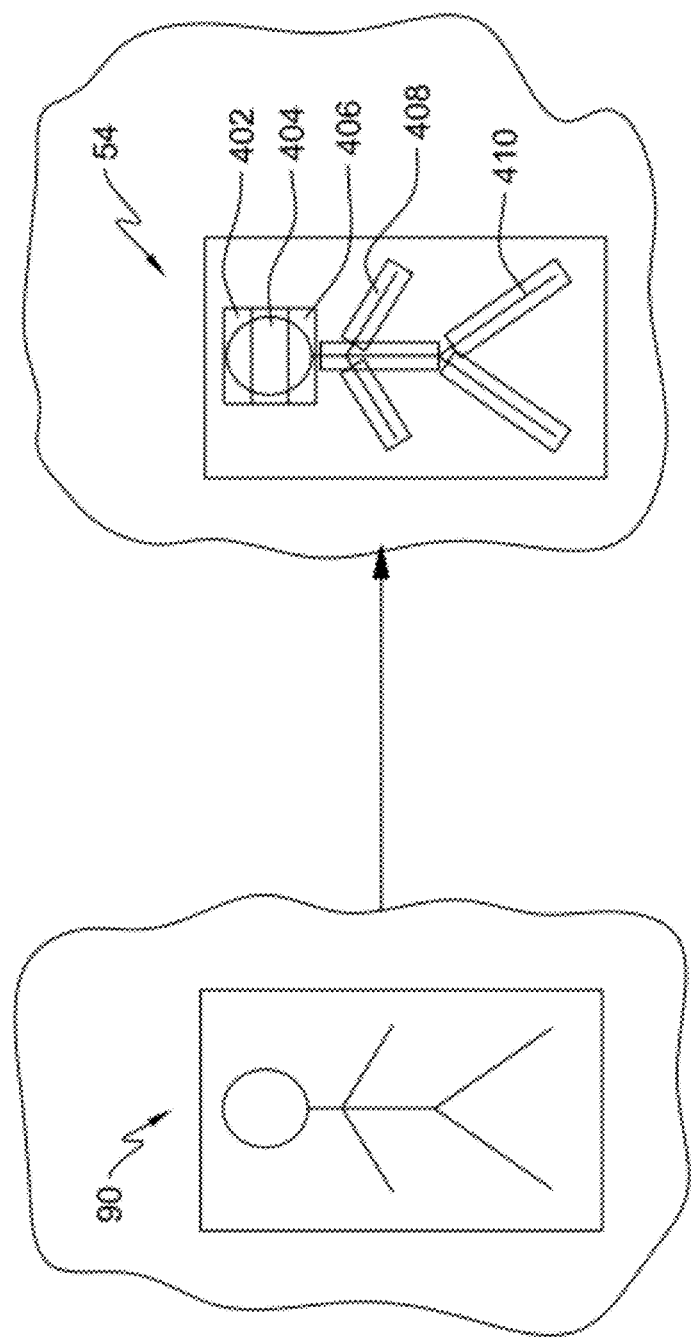
FIG. 3 illustrates an example of input and output according to an embodiment of the invention.

Aspects of the invention provide an improved solution for detecting semantic attributes of objects, such as person 92 (FIG. 1) in video 40. To this extent, FIG. 3 illustrates an example of the input 90 (FIG. 1) and the output 54 (FIG. 1) according to an embodiment of the invention. As described above (FIG. 1), the input 90 is a scene with at least one object, in this example, a person. The output 54 includes spatial locations of body parts and attributes on an image. For example, the invention identifies region 402 as the upper face region and identifies an attribute of the person, "baldness," from the same region. Region 404 is the middle face region and an attribute of "sunglasses" is identified. Region 406 is the lower face region and an attribute of "beard" is identified. Region 408 is identified as an arm and an attribute of "tattoo" is identified. Region 410 is identified as a leg and an attribute of "black trousers" is identified. In addition, the output 54 includes a total score and/or a weighted average score of the image's appearance scores, geometric scores, and resolution context scores if available, as described herein.

Figure 4:
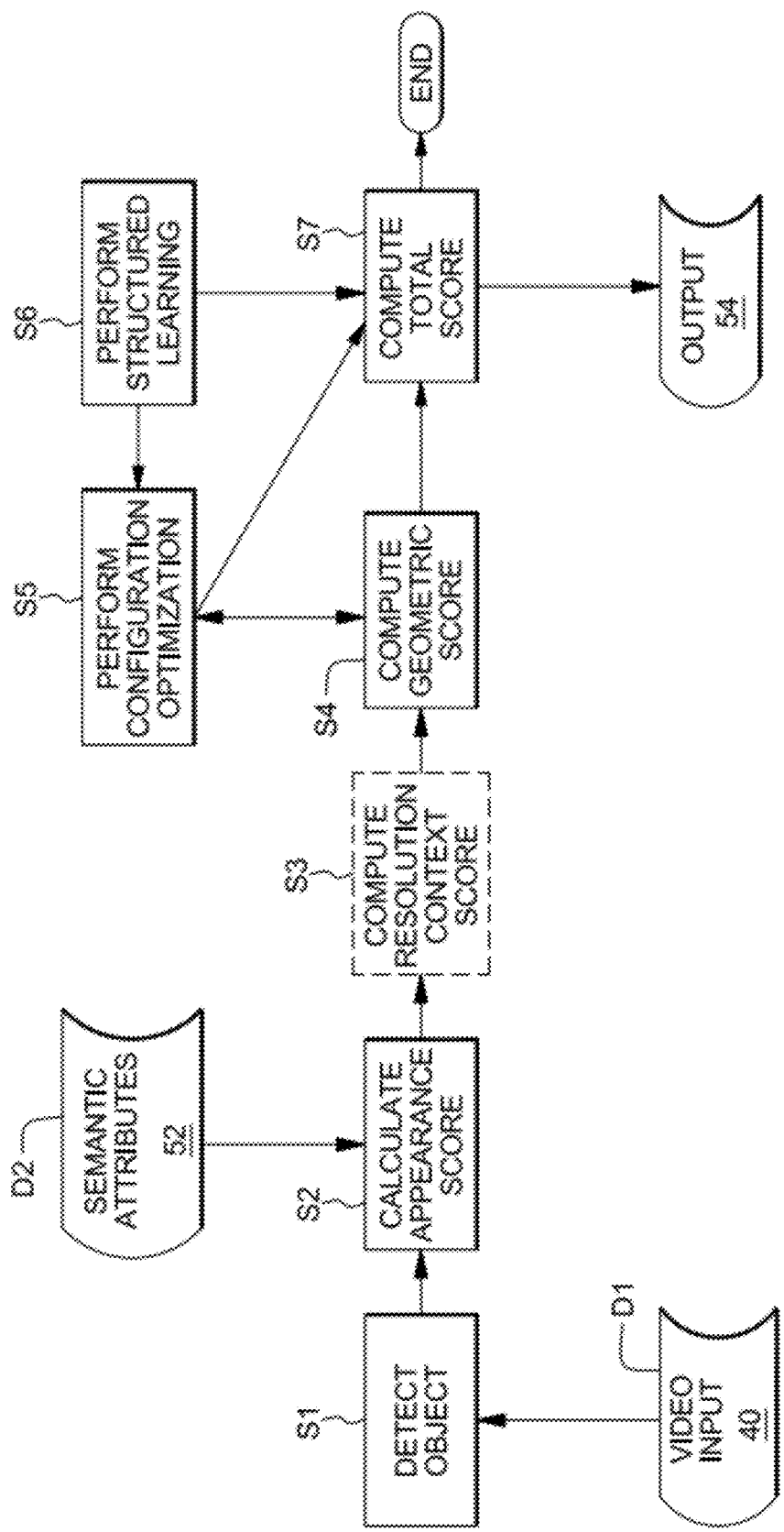
FIG. 4 shows an illustrative data flow for detecting semantic attributes on an image according to an embodiment of the invention.

Aspects of the invention provide an improved solution for detecting semantic attributes of objects, such as person 92 (FIG. 1) in video 40. To this extent, FIG. 4 shows an illustrative data flow for detecting semantic attributes of person 92 (FIG. 1) on an image by using the modules of semantic attribute detection program 30 (FIG. 2), according to an embodiment of the invention. For example, the system 12, at D1, receives digital color video input 40. Digital color video input 40 is typically in red-green-blue (RGB) format and at each time instance a frame of video input with a person 92 (FIG. 1) arrives at the object detection module 32 (FIG. 2).

At S1, object detection module 32 (FIG. 2) detects objects in a frame of video input and identifies the object types thereof. The detection may be tested by using an object classifier to compare the image of the object with previously stored and continuously self-learning objects stored in an objects library (see paper N. Dalal and B. Triggs, "Histograms of Oriented Gradients for Human Detection," Proceedings of the IEEE Conference on Computer Vision and Pattern Recognition, San Diego, USA, June 2005. Vol. II, pp. 886-893). Once an object is identified from the image, the image area covering the object is cropped. Existing technology supports producing lower resolution versions of an image. From the cropped area, at least one lower resolution image of the original cropped area is produced and saved for further analysis along with the original cropped image. In later steps, the lowest resolution image of the cropped area is processed first and images are processed in the order of lower resolution to higher resolution. Higher resolution images are processed for the purpose of obtaining resolution context scores. Particularly, the resolution context score module 37 (FIG. 2) analyzes increasingly higher resolution images of various regions and sub-regions of the image corresponding to various parts and sub-parts of the object. The analysis of a higher resolution image in turn includes calculating appearance scores for semantic attributes, computing geometric scores and computing resolution context scores for sub-regions which are of higher granularity than the regions in the lowest resolution image. The resolution for the lowest resolution image may be predetermined such as being stored as a constant in semantic attribute detection program 30 or provided as input via I/O device 28 (FIG. 2).

D2 maintains a list of semantic attributes and associated images. In addition to describing a semantic attribute, each semantic attribute corresponds to a body part. For example, semantic attributes "sunglasses," "eyeglasses," and "no glasses" all correspond to the body part "middle face region;" semantic attributes "beard," "moustache," and "no facial hair" all correspond to the body part "lower face region." FIG. 5 shows examples of semantic attributes being associated with body parts according to an embodiment of the invention. The list of semantic attributes 52 (FIG. 1) contains both the semantic attributes and their corresponding body parts.

At S2, the appearance score module 34 (FIG. 2) analyzes an image saved from S1, in real-time, or a delayed mode, by evaluating the probability of semantic attributes 52 (D2) being present at regions of the image. As stated above, the lowest resolution image is analyzed first. Semantic attributes likely to be visible on the lowest resolution image may be evaluated at this stage while other semantic attributes likely to be visible on a higher resolution image may be evaluated at a later step. The images of the semantic attributes are stored in a semantic attributes library which is continuously self-learning.

At S2, in evaluating the probability of semantic attributes being present at regions of the image, aspects of the invention employ a method described in the works of Viola et al. in "Robust Real-time Object Detection," Cambridge Research Laboratory Technical Report, February 2001. The method is further described with real-valued confidence scores in the works of Bo Wu et al. in "Fast Rotation Invariant Multi-View Face Detection Based on Real Adaboost," IEEE International Conference on Automatic Face and Gesture Recognition, 2004. The method provides steps to calculate an appearance score to represent the probability of an attribute being present at a region. The presence of a semantic attribute is evaluated through the application of a semantic attribute detector. A detector for a semantic attribute is a function that maps a region of an image into a real number in the interval [0,1], where the output indicates the probability that the semantic attribute is present in the image region given as input. Under the invention, the resulted value of an appearance score can range from 0 to 1. At each region of the image, there may be multiple appearance scores corresponding to the probability of multiple semantic attributes being present at the same region.

Figure 5B:
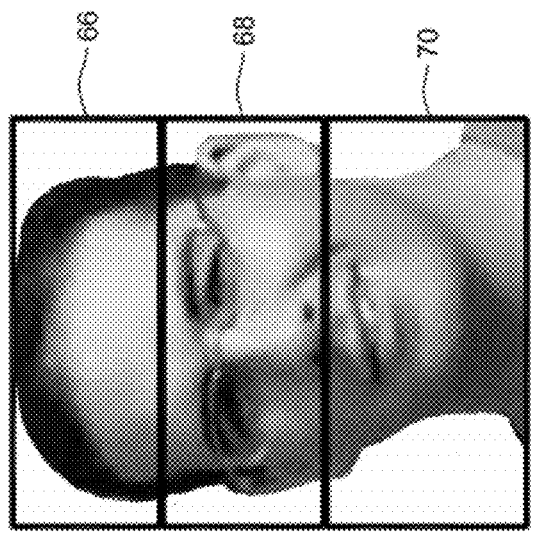
FIGS. 5A and 5B show examples of applying semantic attributes to a human body image according to an embodiment of the invention.
Figure 5A:
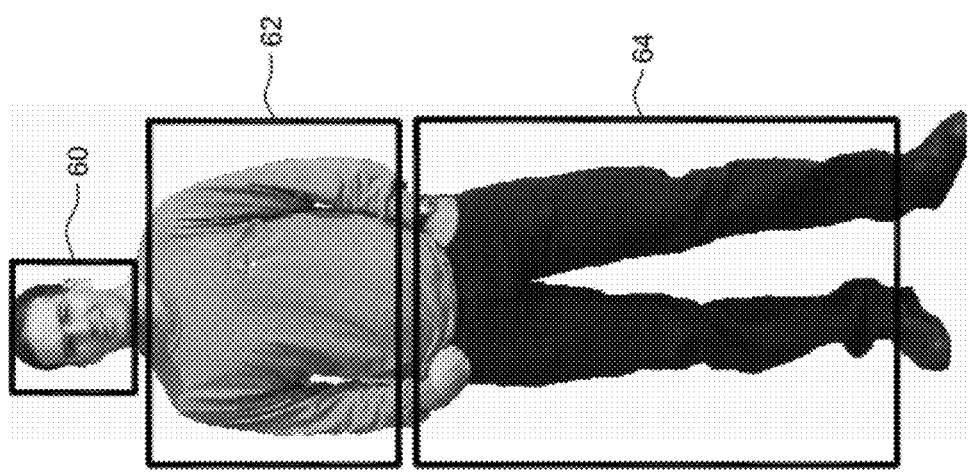

FIGS. 5A and 5B show examples of applying semantic attributes to a human body image according to an embodiment of the invention. In FIG. 5A, unlike prior art which would identify only image regions 60, 62, and 64 as head, torso and legs respectively, embodiments of the invention additionally extract skin color from region 60, shirt color from region 62, and pants color from region 64, etc. Similarly in FIG. 5B, region 66 is not only identified as the upper face region, it may also provide attributes describing hair, baldness, or the presence of a hat. Region 68 is not only identified as the middle face region, it may also provide attributes describing eyes, vision glasses or sunglasses. Region 70 is not only identified as the lower face region, it may also provide attributes for mouth, moustache, or beard. In addition, the image of FIG. 5A is of lower resolution than FIG. 5B. Attribute detectors applicable to the whole body, such as skin color, shirt color and pants color, are applied to lower resolution image in FIG. 5A, while attribute detectors specific to a face, such as hair style, presence of glasses and moustache, are applied to FIG. 5B.

Subsequently in S2 (FIG. 4), the appearance score module 34 (FIG. 2) applies a threshold value to all appearance scores resulted from applying semantic attribute detectors on the image. Appearance scores less than the threshold value will be discarded while the remaining appearance scores will be kept. The threshold value may be predetermined such as being stored as a constant in semantic attribute detection program 30 or provided as input via I/O device 28 (FIG. 2). After applying the threshold value, there still may be more than one appearance score remaining at a region of the image. Each appearance score at each region of the image corresponds to a semantic attribute. As described above, each semantic attribute corresponds to a body part. Hence, each appearance score at a region of the image also corresponds to a body part. Then, each region having appearance scores above the threshold value will be tagged with the corresponding body parts. As a result, the output of the appearance score module 34 includes positions of regions marked with appearance scores and tagged with semantic attributes and body part names, e.g., for region x, the appearance score is 0.6 and the tag is "beard/lower face region" with "beard" being the semantic attribute and "lower face region" being the body part.

Figure 5C:
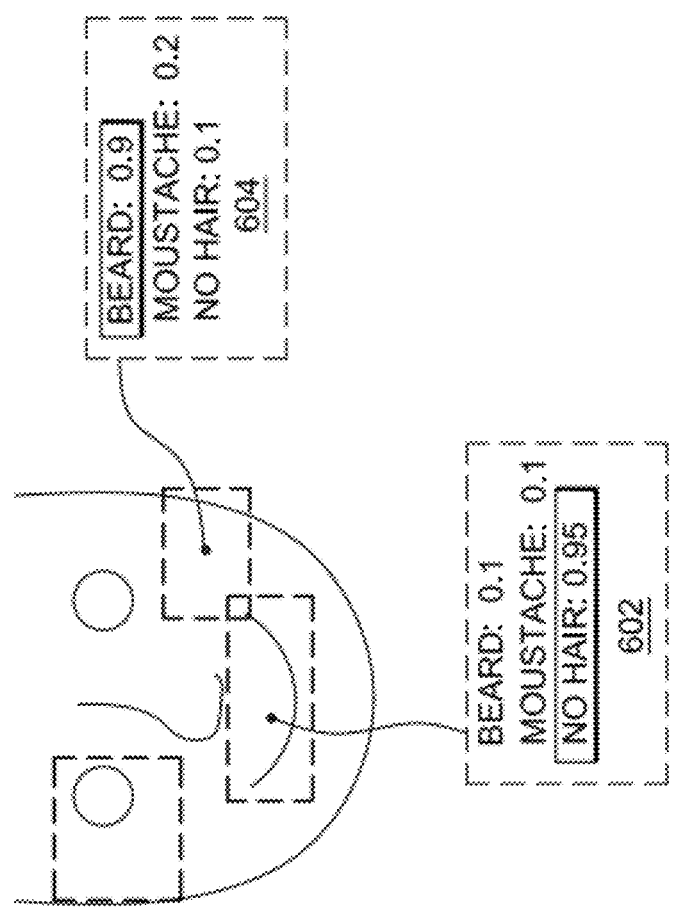
FIG. 5C shows examples of evaluating appearance scores according to an embodiment of the invention.

FIG. 5C shows examples of evaluating appearance scores according to an embodiment of the invention. Region 602 obtains three appearance scores, beard (0.1), moustache (0.1), and "no hair" (0.95). For example, the threshold value is 0.5. As a result, as described above, "no hair" is selected as the attribute for region 602 because "no hair" receives a score that is above the threshold value of 0.5. Similarly, region 604 obtains three appearance scores, beard (0.9), moustache (0.2), "no hair" (0.1). Therefore, beard is selected as the attribute for region 604 because beard receives a score that is above the threshold value of 0.5. As described above, both region 604 and region 602 will be tagged with a body part of "lower face region". Region 604 may be later rejected for having a low geometric score as well as a low resolution context score according to the evaluation by the configuration optimization module in S5 (FIG. 4).

Figure 5D:
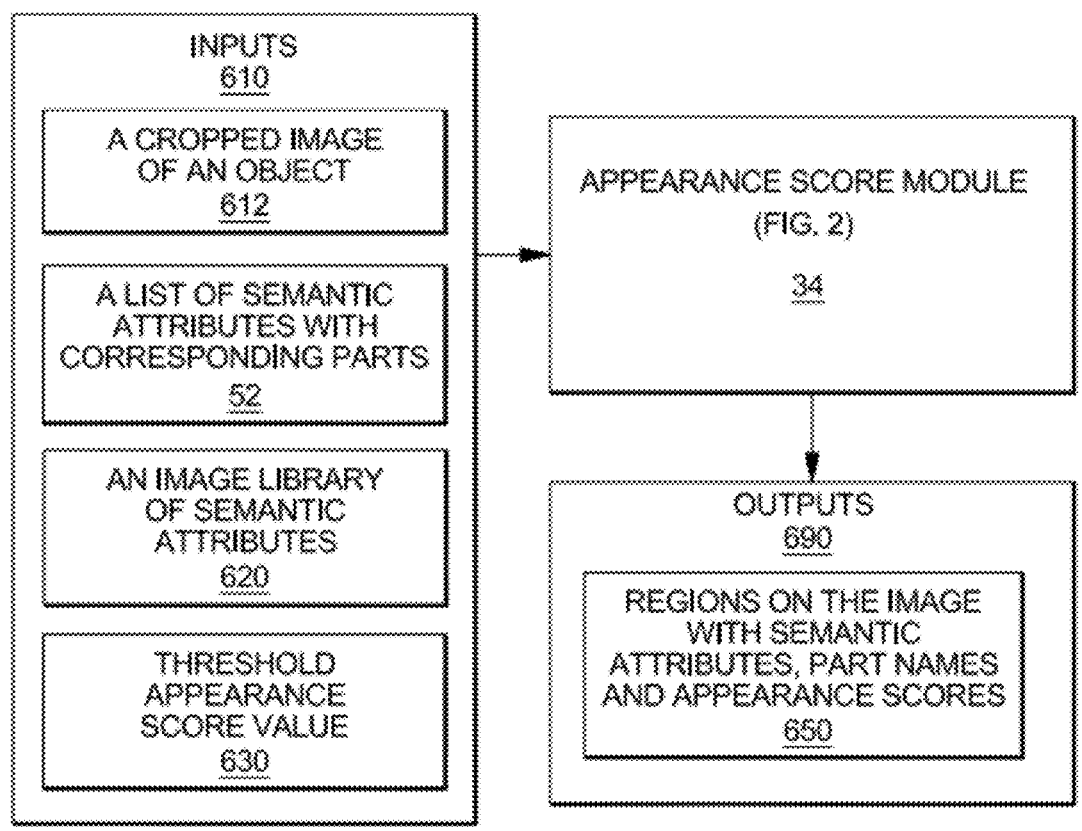
FIG. 5D shows inputs and outputs for the step of computing appearance scores according to an embodiment of the invention.

The output of S2 (FIG. 4) includes positions of regions marked with attributes and appearance scores and tagged with body part names. FIG. 5D shows inputs and outputs for the step calculating appearance scores according to an embodiment of the invention. In calculating appearance scores, the appearance score module 34 (FIG. 2) takes inputs 610, which includes a cropped image of an object 612, a list of semantic attributes with corresponding parts 52, an image library of semantic attributes 620 as references, and an appearance score threshold value 630. The outputs 690 includes regions on the image with semantic attributes, part names and appearance scores 650. The output appearance scores are all above the appearance score threshold value 630.

At S3 (FIG. 4), to compute resolution context scores for the image processed in S2 (e.g., image x), the resolution context score module 37 (FIG. 2) needs to analyze higher resolution images of image x. As described supra, the higher resolution images are produced and saved from S1. The main idea is that, if a body part is visible in an image at a given resolution, it should also be visible on the same image in a higher resolution. For example, at a particular region, region y, semantic attribute "beard" is given a score of 0.9 and consequently region y is tagged as "beard/lower face region". In a higher resolution image, region y is expected to show sub-parts of the lower face region (e.g. mouth, chin, etc.). If it does not happen, it is likely that the body part "lower face region" is actually not present in region y, and a low resolution context score would be assigned to region y.

Figure 6:
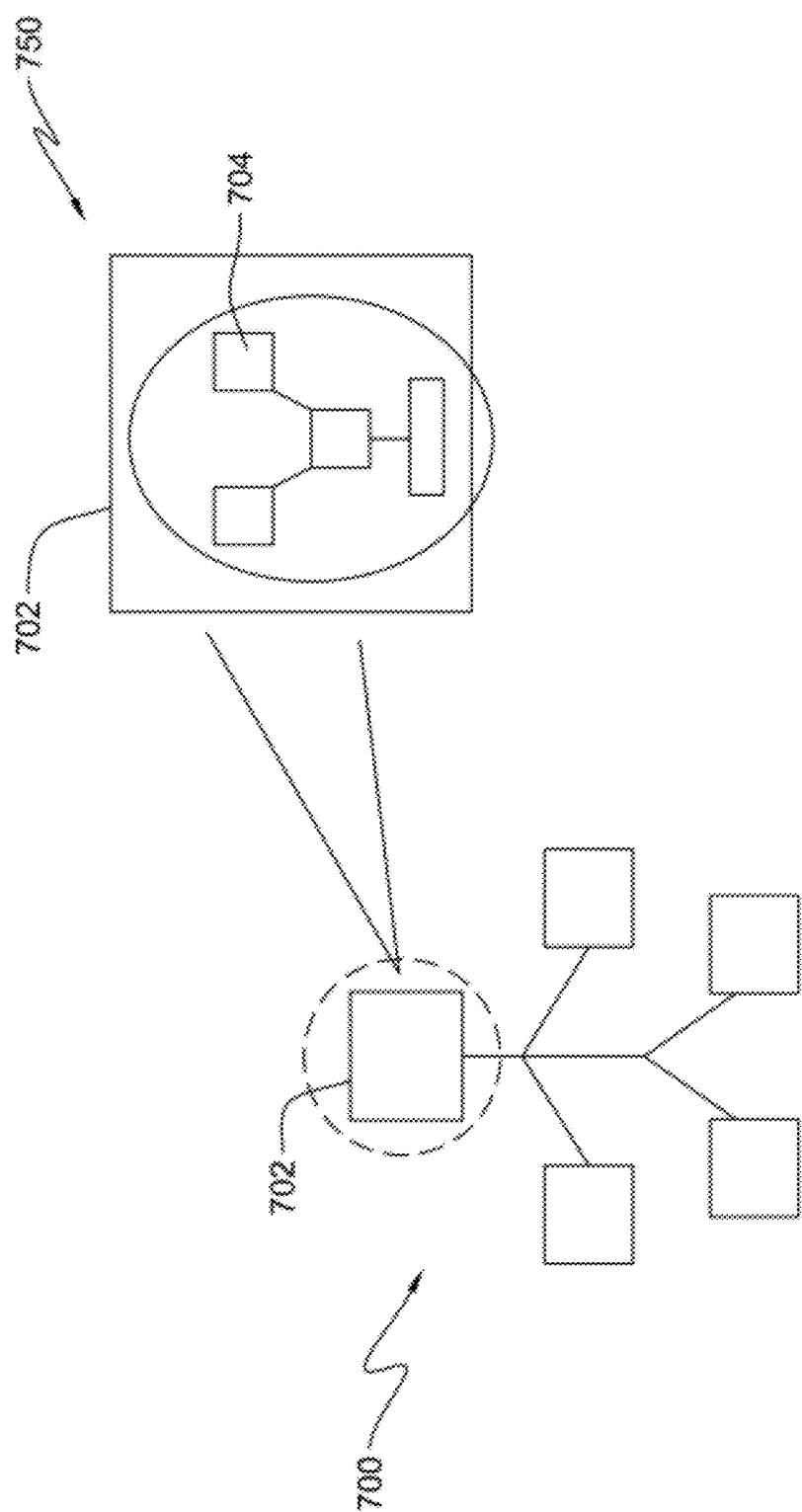
FIGS. 6 and 6A show examples of computing resolution context scores according to an embodiment of the invention.

FIG. 6 shows examples of evaluating resolution context scores according to an embodiment of the invention. Under a lower resolution image, on image 700, the appearance score module 34 (FIG. 2) detects a face body part at region 702 by applying semantic attribute detectors such as beard or eyeglasses or facial skin color. Image 750 is a higher resolution image of region 702. Since the availability of resolution context score for a region depends on the availability of a higher resolution image for the region, with the availability of image 750, a resolution context score for region 702 on image 700 can be obtained. Under image 750, region 702 is evaluated to detect whether the face as detected on image 700 contains expected sub-parts such as eyes, nose, and mouth. Relevant semantic attribute detectors such as beard or eyeglasses or even eye color may be applied to image 750. Accordingly, appearance scores are calculated on image 750 for the semantic attributes applied at regions such as region 704. In addition, geometric scores are calculated for the regions identified with semantic attributes that are above a predetermined threshold value. In short, the steps S2 to S7 in FIG. 4 will be applied to image 750 to produce a total score and/or a weighted average score that is part of output 54 for image 750. Each image produces output 54 when analyzed. The weighted average score from image 750 becomes the resolution context score for region 702 on image 700.

Figure 6A:
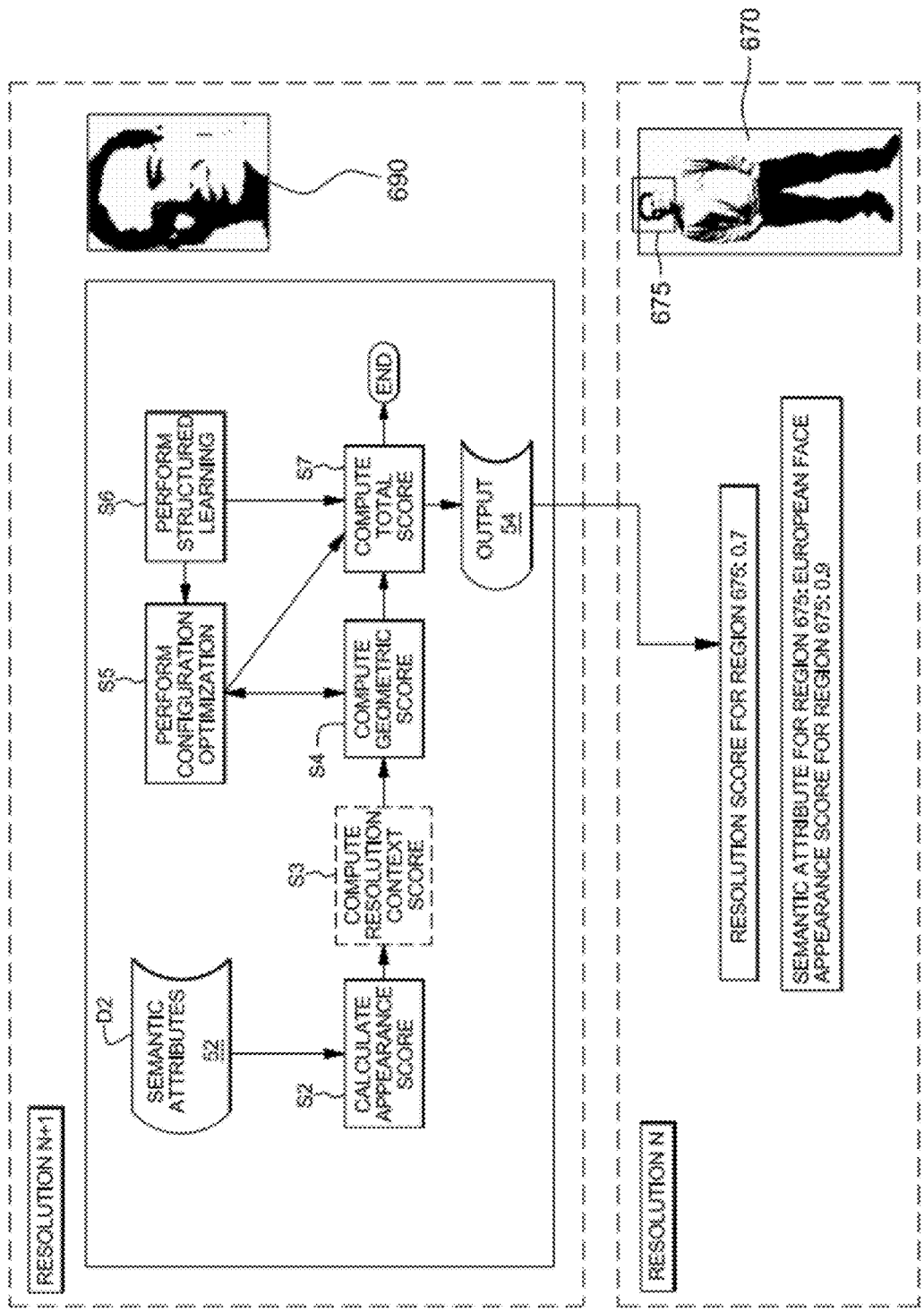

FIG. 6A further illustrates how the resolution context score module 37 arrives at a resolution score. In processing from a lower resolution image to a higher resolution image, image 670 at resolution N is a lower resolution image than image 690 at resolution N+1. At region 675 on image 670, the attribute of "a European face" has an appearance score of 0.9. Image 690 examines region 675 at a higher resolution. The analysis process applied to image 690 includes calculating appearance scores by applying semantic attributes, computing resolution context scores, computing geometric scores (described at a later step), performing configuration optimization (described at a later step), and computing total score (described at a later step). As described supra, the output 54 includes a weighted average of the image's appearance scores, resolution context scores and geometric scores as described herein. Therefore, the weighted average score, 0.7 in this case, from output 54 for image 690 is the resolution context score of region 675 on image 670.

To further illustrate how region 675 on image 670 on FIG. 6A has a resolution context score of 0.7, assume that there are three regions detected on image 690 based on semantic attribute detectors being applied on image 690. Assume that the three regions are region x, region y, and region z. Assume that the appearance scores for region x, region y, and region z on image 690 are 0.9, 0.8, and 0.9 respectively. Assume that geometric scores for region x, region y, and region z on image 690 are 0.5, 0.6 and 0.35 respectively. Assume that there is a higher resolution image for region x, region y, and region z. Assume that the higher resolution image of region x has two sub-regions, region xx and region xy. Assume that region xx and region xy have no corresponding higher resolution images. Assume region xx has an appearance score of 0.95 and region xy has an appearance score of 0.9. Assume that the geometric scores for region xx and region xy are 0.9 and 0.8 respectively. Since there are no corresponding higher resolution images for region xx and region xy, the resolution context score for region xx and region xy is 0. Assume that the weight factor for appearance score, geometric score and resolution context score is 0.5, 0.3 and 0.2 in all analysis in the example. Therefore, the numbers can be represented in Table 1 for the highest resolution image corresponding to region x on image 690.

TABLE 1

|  | Region xx | Region xy | Weight |
| --- | --- | --- | --- |
| Appearance score | 0.95 | 0.9 | 0.5 |
| Geometric score | 0.9 | 0.8 | 0.3 |
| Resolution context score | 0 | 0 | 0.2 |

The weighted average score for the highest resolution image corresponding to region x on image 690 is:

$$(0.95*0.5+0.9*0.3+0*0.2+0.9*0.5+0.8*0.3+0*0.2)/2=0.7275$$

The sum is divided by 2 because there are two regions (region xx and region xy) in the calculation. The output of 0.7275 becomes the resolution context score of region x on image 690. Similarly, assume that, upon analysis of the higher resolution images of region y and region z, the resolution context scores for region y and region z are 0.6 and 0.5 respectively. Table 2 depicts scores for region x, region y and region z on image 690 is shown below.

TABLE 2

|  | Region x | Region y | Region z | Weight |
| --- | --- | --- | --- | --- |
| Appearance score | 0.9 | 0.8 | 0.9 | 0.5 |
| Geometric score | 0.5 | 0.6 | 0.35 | 0.3 |
| Resolution context score | 0.7275 | 0.6 | 0.5 | 0.2 |

Therefore, the weighted average score for image 690 is:

$$(0.9*0.5+0.5*0.3+0.7275*0.2+0.8*0.5+0.6*0.3+ \\ 0.6*0.2+0.9*0.5+0.35*0.3+0.5*0.2)/3 \approx 0.7$$

Because image 690 is the corresponding higher resolution image of region 675 on image 670, region 675 on image 670 has a resolution context score of 0.7.

As further demonstrated in FIG. 6A, the existence of a resolution context score for a region depends on whether a higher resolution image for that region is available for analysis. Therefore, the highest resolution image does not have resolution context scores. As a result, the weighted average score for output 54 for the highest resolution image will include the weighted average of appearance scores and geometric scores only. Also, as demonstrated by FIG. 6A, image 690 provides a resolution context score for region 675 on image 670. Other regions on image 670 will have to go through similar analysis as described above to arrive at their corresponding resolution context scores.

Figure 6B:
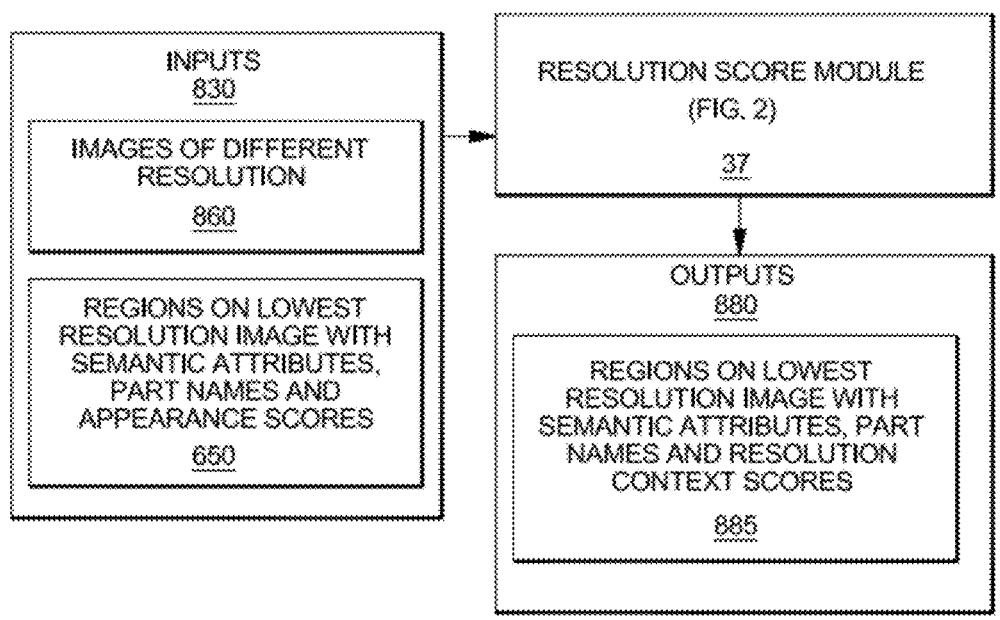
FIG. 6B shows inputs and outputs for the step of computing resolution context scores according to an embodiment of the invention.

The output of S3 (FIG. 4) included regions on the lowest resolution image with semantic attributes, part names and resolution context scores. FIG. 6B shows inputs and outputs for the step evaluating resolution context scores according to an embodiment of the invention. In calculating resolution scores, the resolution score module 37 (FIG. 2) takes inputs 830 which include images of different resolutions 860 and regions on lowest resolution image with semantic attributes, part names and appearance scores 650. The outputs 880 include regions on the lowest resolution image with semantic attributes, part names and resolution context scores 885. In arriving at the final outputs, the resolution score module 37 may produce intermediate outputs including regions on images of different resolutions with semantic attributes, part names and resolution context scores.

At S4 (FIG. 4), the geometric score module 36 (FIG. 2) computes geometric scores by measuring the distances and angles among a particular configuration of candidate regions under analysis and attempts to match the distances and angles among the candidate regions to the geometric configuration of a human body. For example, the more likely a configuration of candidate regions matches the natural displacement of the human body, the higher a geometric score is given for each part in the configuration. In one embodiment, the algorithm to calculate the geometric score is as follows: among the semantic attributes identified at step S2 (FIG. 4), extract part names from the attributes; for each part, the geometric score module 36 computes the distances and angles from all other parts, or just a parent part, when dynamic programming is used for optimization, and use a standard classification method (e.g., Naive Bayes Classifier at http://en.wikipedia.org/wiki/Naive_Bayes_classifier) to give a score ranging from 0 to 1 of how the distances and angles feature vector corresponds to a feasible configuration of the human body. In embodiments, examples of computing geometric scores are provided as follows.

Geometric Score ($G_i$) Examples

The geometric score ($G_i$) for body part i (or region i) may be expressed in terms of a geometric score ($G_{Ai}$) based on angles and/or a geometric score ($G_{Di}$) based on distances.

In one embodiment, $G_i=(G_{Ai}+G_{Di})/2$, which is a straight arithmetic average.

In one embodiment, $G_i=W_A G_{Ai}+W_D G_{Di}$, which is a weighted arithmetic average, wherein the weights ($W_A$, $W_D$) are non-negative real numbers satisfying $W_A+W_D=1$, and wherein the weights ($W_A$, $W_D$) are inputs that may be selected or determined, in one example, based on such factors as the relative accuracy and/or importance of reference values of angles and distance (see below) used to calculate the geometric scores $G_{Ai}$ and $G_{Di}$.

In one embodiment, $G_i=(G_{Ai}*G_{Di})^{1/2}$, which is a geometric average.

In one embodiment, $G_i=G_{Ai}$, wherein only angles, and not distances, are used.

In one embodiment, $G_i=G_{Di}$, wherein only distances, and not angles, are used.

Geometric Score ($G_{Ai}$) Based on Angles

Let $A_i=\{A_{i1}, A_{i2}, \ldots, A_{iN}\}$ denote an array of N angles determined as described supra for between part i (or region i) and each pair of the other body parts (or regions).

Let $a_i=\{a_{i1}, a_{i2}, \ldots, a_{iN}\}$ denote an array of N corresponding reference angles stored in a library or file, wherein $N \geq 2$.

Let $\delta_{Ai}$ denote a measure of a differential between $A_i$ and $a_i$.

In one embodiment, $\delta_{Ai}=[\{(A_{i1}-a_{i1})^2+(A_{i2}-a_{i2})^2+ \ldots + (A_{iN}-a_{iN})^2\}/N]^{1/2}$.

In one embodiment, $\delta_{Ai}=(|A_{i1}-a_{i1}|+|A_{i2}-a_{i2}|+ \ldots +|A_{iN}-a_{iN}|)/N$.

Let $t_A$ denote a specified or inputted angle threshold such that:

$G_{Ai}=0$ if $\delta_{Ai} \geq t_A$; and $G_{Ai}=1-\delta_{Ai}/t_A$ if $\delta_{Ai}<t_A$.

Thus, $G_{Ai}$ satisfies $0 \leq G_{Ai} \leq 1$. In particular, $G_{Ai}=1$ if $\delta_{Ai}=0$ (i.e., if all determined angles are equal to all of the corresponding reference angles). Furthermore, $G_{Ai}=0$ if $\delta_{Ai} \geq t_A$ (i.e., if the measure of the differential between $A_i$ and $a_i$ is intolerably large).

Geometric Score ($G_{Di}$) Based on Distances

Let $D_i=\{D_{i1}, D_{i2}, \ldots, D_{iM}\}$ denote an array of M distances determined as described supra between body part i (or region i) and each other body part (or region).

Let $d_i=\{d_{i1}, d_{i2}, \ldots, d_{iM}\}$ denote an array of M corresponding reference distances stored in a library or file, wherein $M \geq 2$.

Let $\delta_{Di}$ denote a measure of a differential between $D_i$ and $d_i$.

In one embodiment, $\delta_{Di}=[\{(D_{i1}-d_{i1})^2+(D_{i2}-d_{i2})^2+ \ldots + (D_{iN}-d_{iM})^2\}/M]^{1/2}$.

In one embodiment, $\delta_{Di}=(|D_{i1}-d_{i1}|+|D_{i2}-d_{i2}|+ \ldots +|D_{iN}-d_{iM}|)/M$.

Let $t_D$ denote a specified or inputted distance threshold such that:

$G_{Di}=0$ if $\delta_{Di} \geq t_D$; and $G_{Di}=1-\delta_{Di}/t_D$ if $\delta_{Di}<t_D$.

Thus, $G_{Di}$ satisfies $0 \leq G_{Di} \leq 1$. In particular, $G_{Di}=1$ if $\delta_{Di}=0$ (i.e., if all determined distances are equal to all of the corresponding reference distances). Furthermore, $G_{Di}=0$ if $\delta_{Di} \geq t_A$ (i.e., if the measure of the differential between $D_i$ and $d_i$ is intolerably large).

Figure 7B:
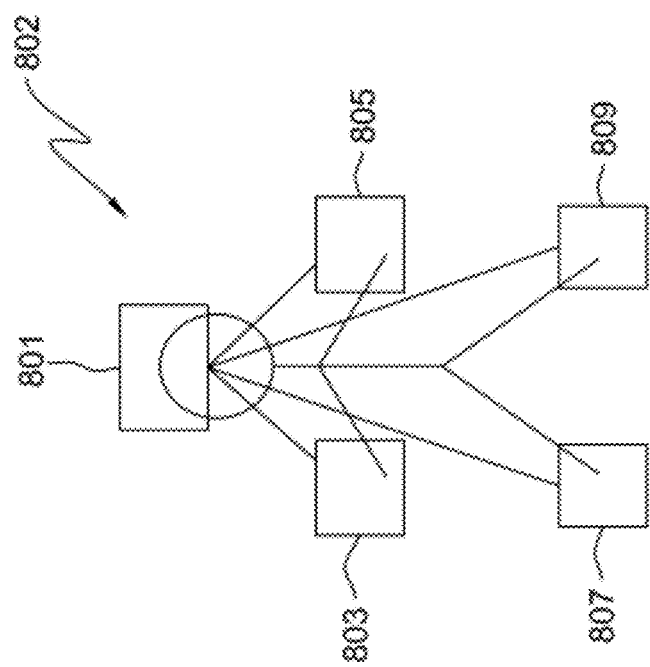
FIGS. 7A and 7B show examples for computing geometric scores for an optimal configuration according to an embodiment of the invention.
Figure 7A:
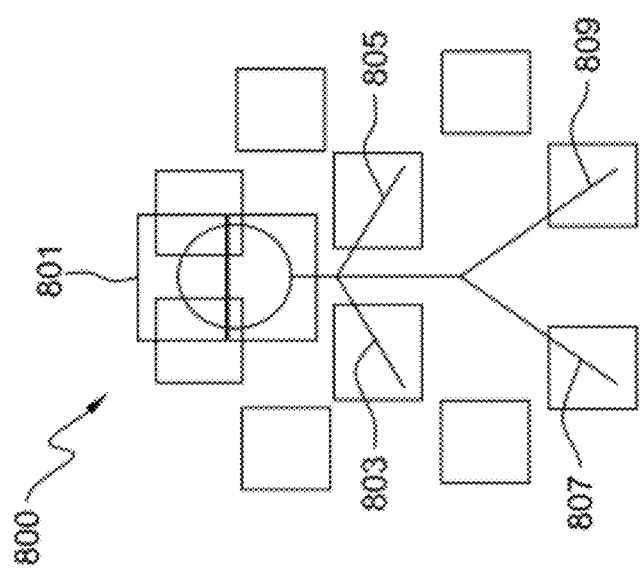

FIGS. 7A and 7B show examples for evaluating geometric scores for an optimal configuration according to an embodiment of the invention. In FIG. 7A, there are many parts identified on illustration 800, with each square representing a region on the image that identifies a semantic attribute with part name. With many isolated parts identified, there are many possible configurations possible to form the human body. The actual human body in the image is superimposed in FIG. 7A. For example, a head may be detected at region 801. Two arms are detected at regions 803 and 805 and two legs are detected at regions 807 and 809. FIG. 7B illustrates a set of regions on illustration 802 being selected as part of an optimal configuration by the configuration optimization module 38. The functionality of the configuration optimization module 38 is described in the subsequent step. As shown in FIG. 7B, regions 801, 803, 805, 807, and 809 are selected as parts of the optimized configuration. The geometric scores are calculated for each region in a given configuration by measuring the angles and distances to other regions. For example, the geometric score of region 801 may be calculated from measuring the angles and distances of region 801 to all other regions belonging to a particular configuration candidate.

Figure 7C:
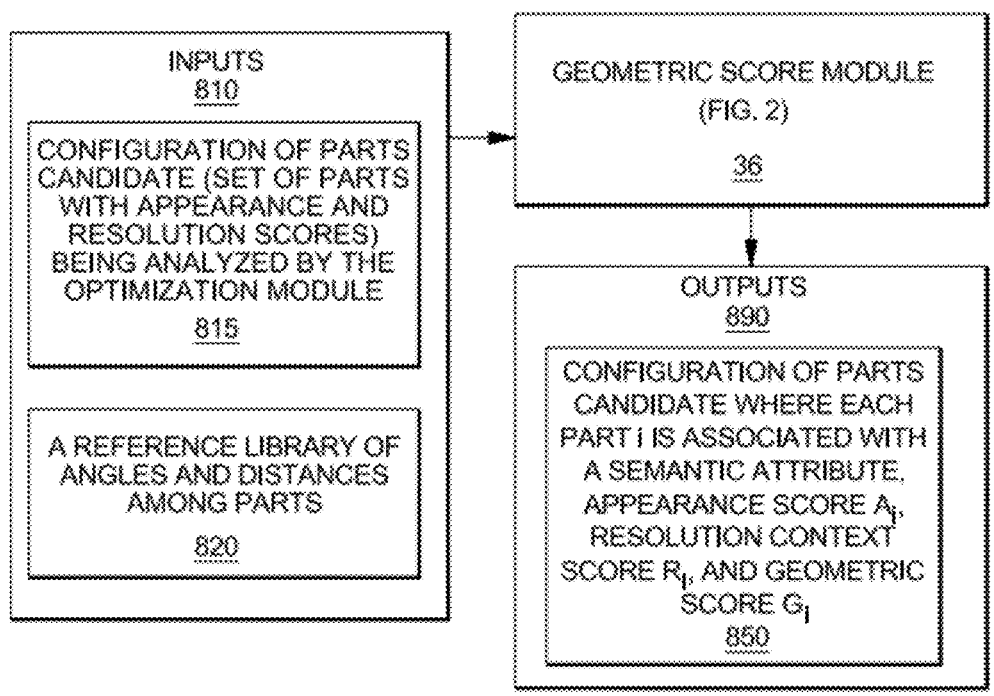
FIG. 7C shows inputs and outputs for the step of computing geometric scores according to an embodiment of the invention.

The outputs of S4 (FIG. 4) include a configuration of candidate parts where each part (i) is associated with a semantic attribute, an appearance score $A_i$, resolution context score $R_i$, and geometric score $G_i$. FIG. 7C shows inputs and outputs for the step evaluating geometric scores according to an embodiment of the invention. In calculating geometric scores, the geometric score module 36 (FIG. 2) takes inputs 810, which may include a candidate configuration of parts (set of parts with appearance scores and resolution scores) being analyzed by the optimization module 815, and a reference library of angles and distances among parts 820. The outputs 890 include 850 candidate configurations of parts where each part (i) is associated with a semantic attribute, appearance score $A_i$, resolution context score $R_i$, and geometric score $G_i$.

At S5 (FIG. 4), the configuration optimization module 38 (FIG. 2) uses dynamic programming to select an optimal configuration based on the appearance scores, geometric scores, and resolution context scores. Given the set of candidates, there may be several possible configurations that could be chosen as the final body parts region plus attributes estimation from the image. The optimal configuration, which is the configuration having the maximal appearance, geometric, and resolution scores, is selected via dynamic programming, using the algorithm proposed in "Pictorial Structures for Object Recognition," Felzenszwalb et al., International Journal of Computer Vision (IJCV), January 2005. When an optimal configuration is selected, the selected regions for the optimal configuration are already associated with semantic attributes and have body part tags at the regions as described above.

Therefore, at S5 (FIG. 4), many possible candidate body configurations can be derived from the available regions and their associated body part tags and attributes. The goal of S5 is to select the best configuration out of the many possible body configurations. The optimization module searches this space of configurations, aiming to determine the configuration with the highest weighted average score in terms of appearance scores, resolution context scores, and geometric scores. As an example, the configuration optimization module 38 may use the formula as described supra used in conjunction with Tables 1 & 2 to compute a weighted average score for each possible configuration and select the one with the highest weighted average score as the output.

As an alternative to having predetermined weights for the three types of scores when calculating the weighted average score, the weights can be dynamically determined. To compute an optimized weighted average score from all three types of scores, S6 (FIG. 4) may determine the optimal weights for the scores. In determining the optimal weights, the structured learning module 35 (FIG. 2) at S6 (FIG. 4) uses a machine learning procedure called "structured learning", described in "Large Margin Methods for Structured and Interdependent Output Variables," Tsochantaridis et al., Journal of Machine Learning Research (JMLR), September 2005. The basic idea includes presenting many examples of body part configurations, including their attributes, to the system. The structured learning module will then optimize the weights such that any configuration in the presented example set has a higher overall score than invalid configurations that do not correspond to valid human body arrangements. Structured learning is also described by Tran et al. in "Configuration Estimates Improve Pedestrian Finding," National Information Processing Systems Foundation 2007. It is a method that uses a series of correct examples to estimate appropriate weightings of features relative to one another to produce a score that is effective at estimating configurations.

At S7 (FIG. 4) the compute total score module 39 (FIG. 2) computes an optimized total score based on the appearance scores, geometric scores, and resolution context scores from the regions in the optimized configuration. With the input from the structured learning module 35 (FIG. 2), the compute total score module 39 utilizes the optimal weights given to the appearance scores, geometric scores and resolution context scores to calculate the optimized total score, which in turn produces the weighted average score of the appearance scores, geometric scores and resolution context scores by dividing the total score with the number of regions being analyzed.

Therefore, each configuration under analysis is composed of a set of parts where each part (i) is associated with an attribute and correspondent appearance score $A_i$, resolution context score $R_i$, and geometric score $G_i$. At S7 (FIG. 4) the compute total score module 39 (FIG. 2) uses the following formula to compute the optimized total score:

$$\sum_i W_1(A_i) + W_2(G_i) + W_3(R_i)$$

where $A_i$ represents appearance scores, $G_i$ represents geometric scores, $R_i$ represents resolution scores for each part i of the configuration, and $W_1$, $W_2$, and $W_3$ correspond to the weights obtained by the structured learning module. $W_1$, $W_2$, and $W_3$ are provided by S6 the structured learning module 35 (FIG. 2) through the method described above.

Figure 8:
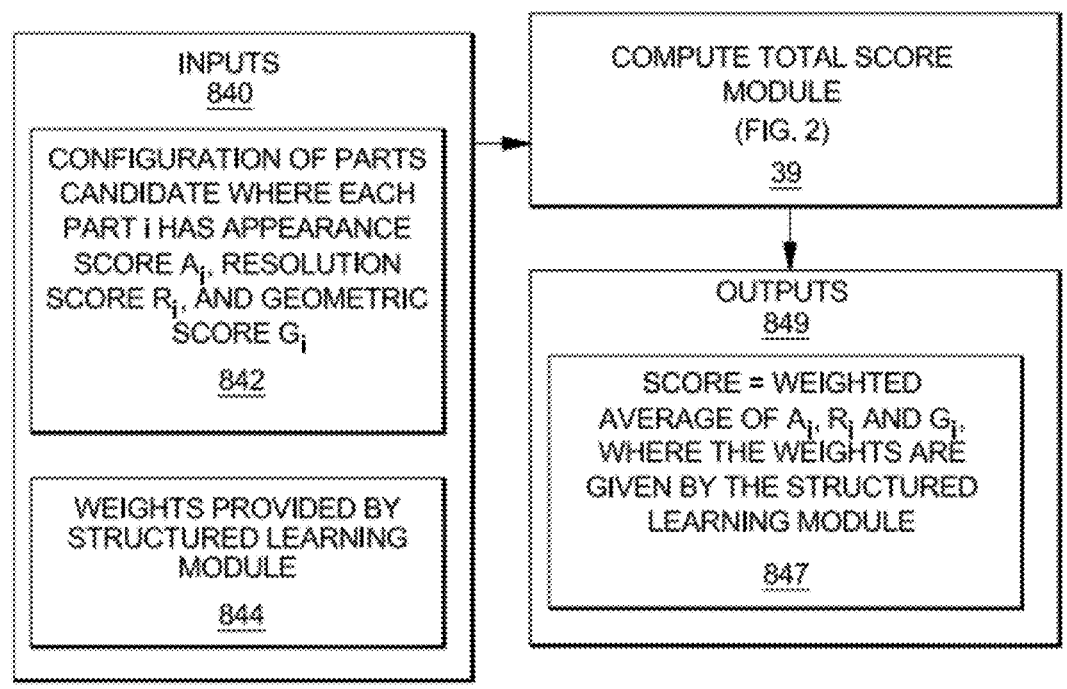
FIG. 8 shows inputs and outputs for the step of computing a total score according to an embodiment of the invention.

FIG. 8 shows inputs and outputs for the step of computing a total score according to an embodiment of the invention. Inputs 840 for the compute total score module 39 (FIG. 2) include 842 candidate configuration of parts where each part (i) has appearance score $A_i$, resolution score $R_i$, and geometric score $G_i$, and 844 weights provided the structured learning module. Once the total score is calculated, the weighted average score can be calculated by dividing the total score with the number of regions on the image being analyzed. The outputs 849 include a score 847 which is the weighted average of $A_i$, $R_i$, and $G_i$.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for determining parts and associated attributes of an object in video, said method comprising:
   receiving a video input;
   detecting an object from said video input and cropping an image of said object from said video input;
   receiving a plurality of semantic attributes with associated parts for said object;
   producing and storing a plurality of versions of said image, each version having a different resolution of said image of said object;
   computing an appearance score at each region of a plurality of regions on the lowest resolution version of said versions of said image of said object for said plurality of semantic attributes, said appearance score for at least one semantic attribute of the plurality of semantic attributes for each region denoting a probability of each semantic attribute of the at least one semantic attribute appearing in the region;
   analyzing increasingly higher resolution versions than the lowest resolution version to compute a resolution context score for each region in the lowest resolution version, said resolution context score in the lowest resolution version being indicative of an extent to which finer spatial structure exists in the increasingly higher resolution versions than in the lowest resolution version for each region;
   ascertaining an optimized configuration of body parts and associated semantic attributes in the lowest resolution version, said ascertaining utilizing the appearance scores and the resolution context scores in the regions in the lowest resolution version; and
   displaying and/or storing said optimized configuration of body parts and associated semantic attributes.

2. The method of claim 1, further comprising:
   computing a geometric score for each region of said plurality of regions on the lowest resolution version, said geometric score computing a probability of a region matching stored reference data for a reference object corresponding to the detected object with respect to angles and distances among the plurality of regions.

3. The method of claim 2, wherein the resolution context score for the lower resolution version of said image is computed as a weighted average score computed from a plurality of scores for a next higher resolution version of said higher resolution versions of said image.

4. The method of claim 3, wherein said plurality of scores for said next higher resolution version of said image comprise appearance scores and geometric scores.

5. The method of claim 3, wherein said plurality of scores for said next higher resolution version of said image comprise appearance scores, geometric scores and resolution context scores.

6. The method of claim 5, wherein said weighted average score for the next higher resolution version of the image is computed using the following formula divided by I:

$$\sum_i W_1(A_i) + W_2(G_i) + W_3(R_i)$$

wherein I represents the number of regions in the next higher resolution version of the image, i is a region index, $$\sum_i$$

denotes a summation from i=1 to i=I, $A_i$ represents appearance scores in region i, $G_i$ represents geometric scores in region i, $R_i$ represents resolution context scores in region i, and $W_1$, $W_2$ and $W_3$ represent weights respectively assigned to the appearance scores, the geometric scores, and the resolution context scores.

7. The method claim of 6, further comprising:
storing and/or displaying output of at least one portion of said image in at least one version of said higher level versions of said image with spatial information on semantic attributes and associated parts.

8. A computer program product comprising:
a non-transitory computer readable storage medium having computer readable program code embodied in the storage medium, said computer readable program code containing instructions that perform a method for estimating parts and attributes of an object in video, said method comprising:
receiving a video input;
detecting an object from said video input and cropping an image of said object from said video input;
receiving a plurality of semantic attributes with associated parts for said object;
producing and storing a plurality of versions of said image, each version having a different resolution of said image of said object;
computing an appearance score at each region of a plurality of regions on the lowest resolution version of said versions of said image of said object for said plurality of semantic attributes, said appearance score for at least one semantic attribute of the plurality of semantic attributes for each region denoting a probability of each semantic attribute of the at least one semantic attribute appearing in the region;
analyzing increasingly higher resolution versions than the lowest resolution version to compute a resolution context score for each region in the lowest resolution version, said resolution context score in the lowest resolution version being indicative of an extent to which finer spatial structure exists in the increasingly higher resolution versions than in the lowest resolution version for each region;
ascertaining an optimized configuration of body parts and associated semantic attributes in the lowest resolution version, said ascertaining utilizing the appearance scores and the resolution context scores in the regions in the lowest resolution version; and
displaying and/or storing said optimized configuration of body parts and associated semantic attributes.

9. The computer program product of claim 8, said computer readable program code further containing instructions that perform:
computing a geometric score for each region of said plurality of regions on the lowest resolution version, said geometric score computing a probability of a region matching stored reference data for a reference object corresponding to the detected object with respect to angles and distances among the plurality of regions.

10. The computer program product of claim 9, wherein the resolution context score for the lower resolution version of said image is computed as a weighted average score computed from a plurality of scores for a next higher resolution version of said higher resolution versions of said image.

11. The computer program product of claim 10, wherein said plurality of scores for said next higher resolution version of said image comprise appearance scores and geometric scores.

12. The computer program product of claim 10, wherein said plurality of scores for said next higher resolution version of said image comprise appearance scores, geometric scores and resolution context scores.

13. The computer program product of claim 12, wherein said weighted average score for the next higher resolution version of the image is computed using the following formula divided by I:

$$\sum_i W_1(A_i) + W_2(G_i) + W_3(R_i)$$

wherein I represents the number of regions in the next higher resolution version of the image, i is a region index, $$\sum_i$$

denotes a summation from i=1 to i=I, $A_i$ represents appearance scores in region i, $G_i$ represents geometric scores in region i, $R_i$ represents resolution context scores in region i, and $W_1$, $W_2$ and $W_3$ represent weights respectively assigned to the appearance scores, the geometric scores, and the resolution context scores.

14. The computer program product of claim 13, said computer readable program code further containing instructions that perform:
storing and/or displaying output of at least one portion of said image in at least one version of said higher level versions of said image with spatial information on semantic attributes and associated parts.

15. A computer system comprising a processor and a computer readable memory unit coupled to the processor, said computer readable memory unit containing instructions that when run by the processor implement a method for estimating parts and attributes of an object in video, said method comprising:
receiving a video input;
detecting an object from said video input and cropping an image of said object from said video input;
receiving a plurality of semantic attributes with associated parts for said object;
producing and storing a plurality of versions of said image, each version having a different resolution of said image of said object;
computing an appearance score at each region of a plurality of regions on the lowest resolution version of said versions of said image of said object for said plurality of semantic attributes, said appearance score for at least one semantic attribute of the plurality of semantic attributes for each region denoting a probability of each semantic attribute of the at least one semantic attribute appearing in the region;

analyzing increasingly higher resolution versions than the lowest resolution version to compute a resolution context score for each region in the lowest resolution version, said resolution context score in the lowest resolution version being indicative of an extent to which finer spatial structure exists in the increasingly higher resolution versions than in the lowest resolution version for each region;

ascertaining an optimized configuration of body parts and associated semantic attributes in the lowest resolution version, said ascertaining utilizing the appearance scores and the resolution context scores in the regions in the lowest resolution version; and displaying and/or storing said optimized configuration of body parts and associated semantic attributes.

16. The system of claim 15, said computer readable memory unit containing further instructions that when run by the processor implement:

computing a geometric score for each region of said plurality of regions on the lowest resolution version, said geometric score computing a probability of a region matching stored reference data for a reference object corresponding to the detected object with respect to angles and distances among the plurality of regions.

17. The system of claim 16, wherein the resolution context score for the lower resolution version of said image is computed as a weighted average score computed from a plurality of scores for a next higher resolution version of said higher resolution versions of said image.

18. The system of claim 17, wherein said plurality of scores for said next higher resolution version of said image comprise appearance scores and geometric scores.

19. The system of claim 17, wherein said plurality of scores for said next higher resolution version of said image comprise appearance scores, geometric scores and resolution context scores.

20. The system of claim 19, wherein said weighted average score for the next higher resolution version of the image is computed using the following formula divided by I:

$$\sum_i W_1(A_i) + W_2(G_i) + W_3(R_i)$$

wherein I represents the number of regions in the next higher resolution version of the image, i is a region index, $$\sum_i$$

denotes a summation from i=1 to i=I, $A_i$ represents appearance scores in region i, $G_i$ represents geometric scores in region i, $R_i$ represents resolution context scores in region i, and $W_1$, $W_2$ and $W_3$ represent weights respectively assigned to the appearance scores, the geometric scores, and the resolution context scores.

21. The system of claim 20, said computer readable memory unit containing further instructions that when run by the processor implement:

storing and/or displaying output of at least one portion of said image in at least one version of said higher level versions of said image with spatial information on semantic attributes and associated parts.

22. A process for supporting computer infrastructure, said process comprising providing at least one support service for at least one of creating, integrating, hosting, maintaining, and deploying computer-readable code in a computer system, wherein the code in combination with the computing system is capable of performing a method for estimating parts and attributes of an object in video, said method comprising: receiving a video input; detecting an object from said video input and cropping an image of said object from said video input; receiving a plurality of semantic attributes with associated parts for said object; producing and storing a plurality of versions of said image, each version having a different resolution of said image of said object; computing an appearance score at each region of a plurality of regions on the lowest resolution version of said versions of said image of said object for said plurality of semantic attributes, said appearance score for at least one semantic attribute of the plurality of semantic attributes for each region denoting a probability of each semantic attribute of the at least one semantic attribute appearing in the region; analyzing increasingly higher resolution versions than the lowest resolution version to compute a resolution context score for each region in the lowest resolution version, said resolution context score in the lowest resolution version being indicative of an extent to which finer spatial structure exists in the increasingly higher resolution versions than in the lowest resolution version for each region; ascertaining an optimized configuration of body parts and associated semantic attributes in the lowest resolution version, said ascertaining utilizing the appearance scores and the resolution context scores in the regions in the lowest resolution version; and displaying and/or storing said optimized configuration of body parts and associated semantic attributes.

23. The process of claim 22, said method further comprising: computing a geometric score for each region of said plurality of regions on the lowest resolution version, said geometric score computing a probability of a region matching stored reference data for a reference object corresponding to the detected object with respect to angles and distances among the plurality of regions.

24. The process of claim 23, wherein the resolution context score for the lower resolution version of said image is computed as a weighted average score computed from a plurality of scores for a next higher resolution version of said higher resolution versions of said image.

* * * * *